United States Patent [19]

Moore et al.

[11] Patent Number: 5,085,150

[45] Date of Patent: Feb. 4, 1992

[54] TROLLEY BODY WITH EMBEDDED INSERTS FOR AXLES HAVING A PERIPHERAL GROOVE CAST INTO BODY

[75] Inventors: Archie S. Moore, Kansas City, Mo.; Robert J. Teske, Eudora, Kans.

[73] Assignee: Mid-West Conveyor Company, Inc., Kansas City, Kans.

[21] Appl. No.: 496,257

[22] Filed: Mar. 20, 1990

[51] Int. Cl.$^5$ ............................................. B61B 3/00
[52] U.S. Cl. ................................. 105/150; 104/89; 104/93; 295/36.1; 164/98
[58] Field of Search ................. 104/89, 93, 91; 105/150, 154, 155; 295/36.1, 42.2, 47, 49; 29/527.5; 164/98, 111

[56] References Cited

U.S. PATENT DOCUMENTS

| | | | |
|---|---|---|---|
| 1,652,009 | 12/1927 | Hoffmaster | 295/47 X |
| 1,716,833 | 6/1929 | Rich | 164/99 |
| 2,611,326 | 9/1952 | Smallpeice | 105/154 |
| 2,639,535 | 5/1953 | Greske | 105/150 X |
| 3,307,423 | 3/1967 | Dansi | 164/111 X |
| 3,906,867 | 9/1975 | Knudsen | 104/89 X |
| 4,100,669 | 7/1978 | Pemper | 164/111 X |
| 4,245,562 | 1/1981 | Knudsen | 104/172.4 |
| 4,248,157 | 2/1981 | Evans | 105/154 |
| 4,313,249 | 2/1982 | Douthwaite | 164/98 X |
| 4,384,387 | 5/1983 | Pachuta | 105/150 X |
| 4,552,073 | 11/1985 | Smith | 105/154 |

*Primary Examiner*—Robert J. Oberleitner
*Assistant Examiner*—S. Joseph Morano
*Attorney, Agent, or Firm*—Litman, McMahon & Brown

[57] ABSTRACT

A trolley body for a power and free conveyor system having preformed machinable inserts cast into an austempered ductile iron body for axles wherein ends of the inserts to be embedded therein are center-drilled for positioning purposes in a casting mold. The preformed axles have a hexagonally-shaped cross-section to prevent rotation of the axles relative to the body and also have a groove thereabout to prevent axial movement of the axles relative to the body. The axles are constructed of swagable material to allow subsequent securement of wheels thereon. Gates in the trolley body casting for introducing the molten iron into the casting are situated immediately above or in near proximity to each insert embedded therein to minimize solidification shrinkage thereabout.

3 Claims, 3 Drawing Sheets 5,085,150

TROLLEY BODY WITH EMBEDDED INSERTS FOR AXLES HAVING A PERIPHERAL GROOVE CAST INTO BODY

BACKGROUND OF THE INVENTION

The present invention is directed to an improved power and free conveyor trolley construction and method of construction wherein malleable axles for attaching wheels are incorporated into a cast trolley body.

Power and free conveyor systems are in wide-spread use for transporting parts, goods under construction, finished goods, etc. The component, which has made conveyor systems so useful, is commonly referred to as a trolley. A trolley includes a body typically supported on wheels or rollers which are mounted on axles generally transverse to the trolley bodies. Many of the applications for power and free conveyor systems include automobile assembly lines and other types of assembly requiring the support and transport of relatively heavy parts or completed products by the conveyor system. As a result, trolleys are very often subjected to the requirement of conveying and transporting substantial loads. Heavy duty trolleys of this type can be expensive to construct.

One approach commonly used to minimize fabrication costs of the trolley bodies has been to cast the bodies for trolleys with integral laterally extending projections for the axles. The projections are subsequently machined to the size and shape required to mate with the wheels and then secured to an inner race of a wheel to complete construction of the trolley. The major problem with this approach, however, is that the materials which can be formed from a cast molten process are normally not sufficiently malleable or machinable to allow swaging or other operations that provide for easy attachment of the wheel and also do not have the more desirable high strength characteristics preferred for this type of application. As a result, trolleys manufactured by this process are relatively short-lived, which results in reduced reliability, frequent maintenance and potentially substantial downtime for an assembly line which depends on power and free conveyor systems.

An approach which has been used to improve the lifetime of the trolleys is to pour or cast the trolley bodies as described with the preceding approach but without the integral laterally extending projections. After casting, the trolley bodies are precision machined and bores are drilled to receive preformed axles made of high strength steel which more readily meet the requirements of extended performance and reduced maintenance. Unfortunately, the precision machining and the pressing of the preformed axles into the trolley bodies substantially increases the manufacturing costs thereof and the axles may work loose from the body associated therewith.

A technology now exists for a material—austempered ductile iron ("ADI")—which exhibits a wider range of properties than any other engineering material presently available for constructing trolley bodies. The present invention provides the ability to incorporate high strength machinable steel axles into a cast trolley body constructed of austempered ductile iron while eliminating the high costs associated with the subsequent machining and pressing processes.

SUMMARY OF THE INVENTION

The present invention is directed to trolleys for power and free conveyor systems and a method of manufacturing such trolleys including one or more axle inserts cast into a body of each of the trolleys for a supporting wheel or wheels. The inserts are constructed of high strength material having extended performance characteristics so as to have relatively lower production costs and longer life as compared to prior art trolleys. In particular, inserts having desired wheel supporting characteristics are appropriately positioned in a casting mold and molten iron is poured thereabout.

The resulting body with embedded inserts is then appropriately heat treated to effect austempered iron characteristics. The resulting trolley body has wheel axles that resolve trolley fabrication problems which have existed for years in the industry as well as provide a trolley with relatively long life. Although austempered iron has many desirable characteristics for a trolley body, it is not suitable for swaging or riveting so as to allow simple attachment to wheels.

In early stages of the development of the present invention, it was found that the molten iron sometimes shrunk away from the inserts during the cooling process. As a result, the inserts which were to be used as axles were loose and, therefore, could not reliably serve their intended purpose, particularly under heavy loads. These complications were subsequently solved, however, by positioning sprues or gates for introducing the molten iron into the mold such that the molten material is gated immediately above or in near proximity to each insert. As a result, the tendency for the solidifying iron to shrink in the vicinity of the inserts and the inserts to become loose relative to the body is greatly reduced.

To further reduce the likelihood of the insert becoming loose and rotating within the trolley body, the inserts are constructed from machine stock having a hexagonal cross-section.

Additionally, a circumferential groove is positioned around each preshaped insert around the portion of the insert located within the trolley body and spaced along a peripheral surface thereof from each end such that the groove is embedded within and completely encompassed by the cast trolley body subsequent to casting, thereby preventing any tendency toward lateral movement of such a preformed insert relative to the trolley body.

Subsequent to the casting process, wheels or rollers are inserted over the protruding ends of the axle inserts and the distal end thereof swaged, so as to rigidly secure each such wheel or roller to the trolley body.

OBJECTS OF THE INVENTION

Therefore, the objects of the present invention are as follows: to provide a trolley body utilizing austempered iron; to provide a trolley body with preformed inserts located within casts for the body such that the inserts are secured within the body by solidification of the molten iron, such inserts for use as axles having high strength and machinable characteristics for supporting wheels; to provide such inserts having cross-sectional profiles which are resistant to rotation relative to said trolley body; to provide inserts with transverse profiles or contours to prevent axial movement of an insert relative to the trolley body; to provide a method for casting trolley bodies with inserts which are rigidly and reliably secured therein; to provide a method for reliably positioning said inserts within said mold while casting the trolley body thereabout; to provide such a method including the positioning of gates for filling molds near or directly above such inserts so as to improve adhesion of the inserts to the trolley body; and to generally provide a trolley body with long performance, minimal maintenance, reduced downtime, relatively simple and economical manufacturing characteristics and features which provide the intended purposes thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
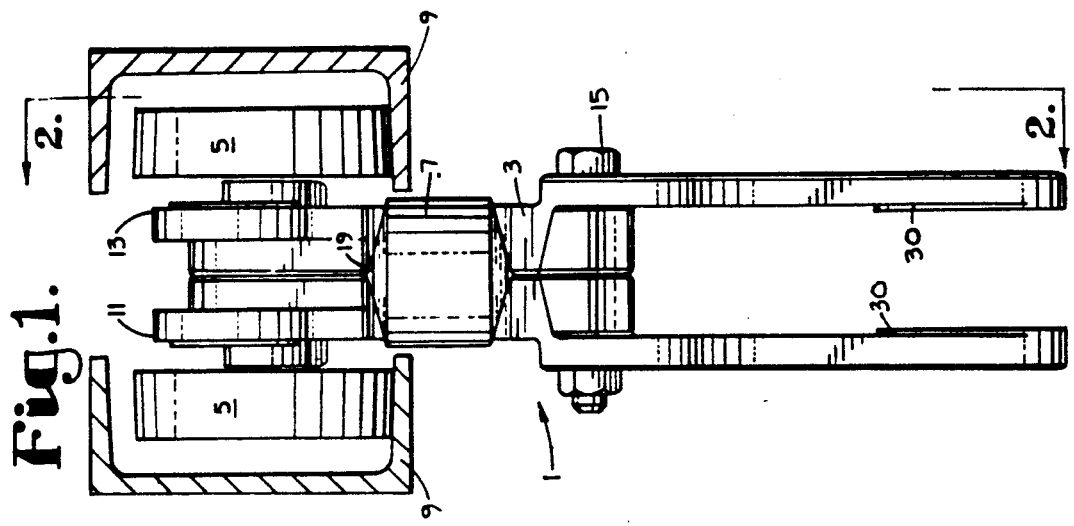
FIG. 1 is an end elevational view of a power and free conveyor trolley with embedded inserts having wheels installed thereon according to the present invention.

The reference numeral 1 generally designates a trolley according to the present invention for use in conjunction with a power and free conveyor system or the like, comprising a body 3, two sets of opposing pairs of wheels 5, each of which pair of wheels 5 operates in conjunction with an alignment roller 7 which maintains lateral spacing of the trolley 1 relative to a cooperatively spaced pair of channels 9 for supporting the wheels 5. The trolley body 3 comprises two substantially identical trolley body halves, such as the trolley body halves 11 and 13 as shown in FIG. 1, adapted to be cooperatively spaced back to back and rigidly secured to each other, such as by bolts 15 or the like, with the wheels 5 installed on inserts 17 embedded in the body halves 11 and 13 as hereinafter described. (In the following discussion, it is to be understood that a reference to the trolley body half 11 shall equally apply the trolley body half 13.)

Figure 3:
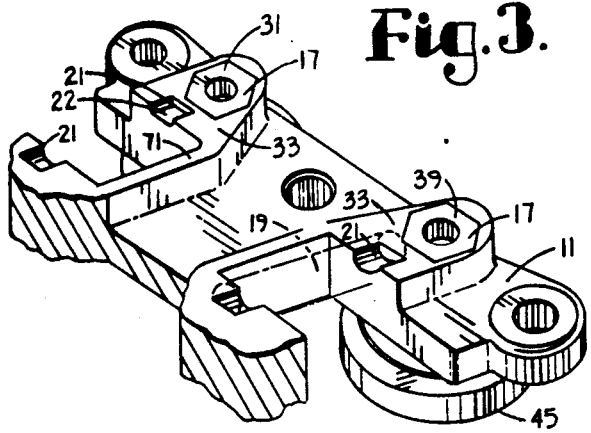
FIG. 3 is a perspective view of half of a trolley having a body with embedded axle inserts and having wheels installed thereon.
Figure 4:
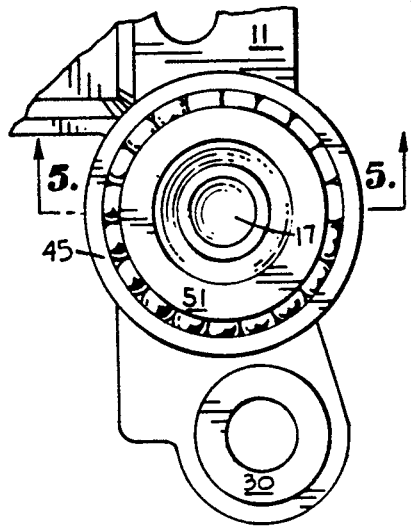
FIG. 4 is a fragmentary side elevational view of half of the trolley body with a wheel installed thereon.

The rollers 7 are pivotally secured on shafts 19 which are clamped in recesses 21, as indicated in phantom in FIG. 3, when the two body halves 11 and 13 are secured together. Each shaft 19 has a flat which abuts against an offset 22 which is formed in at least one of the recesses 21 to prevent rotation of the shafts 19.

Figure 2:
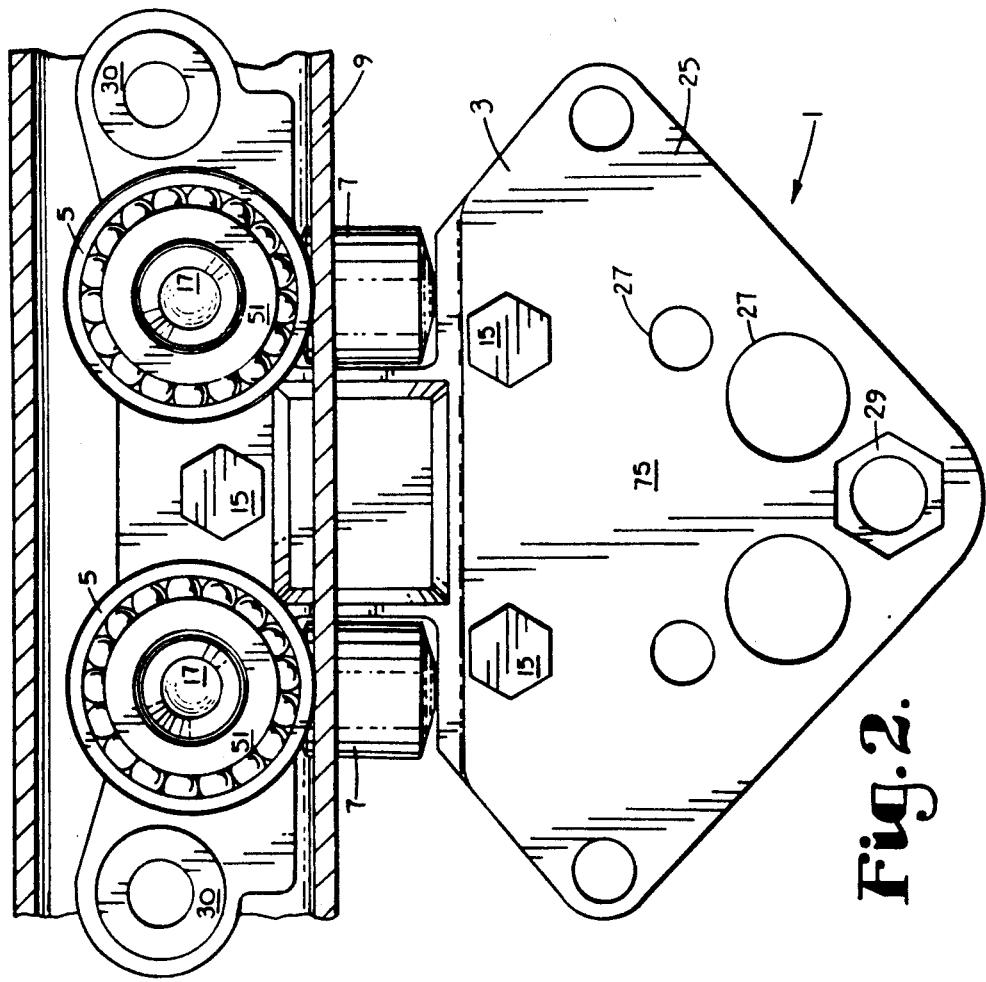
FIG. 2 is a side elevational view, taken along line 2—2 of FIG. 1.

A suspended portion 25 of the trolley body half 11 has bores 27 cast therein as hereinafter described to permit the trolley 1 to be adaptable to a variety of uses. The bores 27 may be further configured as desired, such as a hexagonal recess 29 to mate with a bolt or nut (not shown) and bosses 30 as shown in FIG. 2.

The body half 11 is preferably constructed of cast iron which, by appropriate heat treatment thereof, is converted to austempered ductile iron (hereinafter "ADI"), which provides physical characteristics which are desirable for the trolley 1, such as lightweightness, strength, hardness, wear resistance, ability to elongate (ductility), and economy. The form of the body half 11 is obtained by casting molten metal in a mold as hereinafter described.

The ability to swage, to machine, or to make certain other alterations to the inserts 17 is desirable. Therefore, the inserts 17 are preferably constructed of machinable and readily deformable or malleable material such as 1215 carbon steel which has those desirable physical characteristics which survive the ADI heat treating process.

Hexagonal machine stock that is swagable and has acceptable physical characteristics is readily obtainable in long standard lengths and is relatively inexpensive. Such stock is cut to appropriate lengths and machined as necessary to form the inserts 17. In many cases, it is preferable and generally advantageous to totally perform all machining of the inserts 17 prior to conducting the casting operation. In some applications, however, it may be more advantageous to perform some of the machining requirements for the inserts 17 subsequent to conducting the casting operation.

Although the illustrations and descriptions provided herein are predominantly directed toward the utilization of the inserts 17 as axles for the trolley 1, it is foreseen that the inserts 17 can be similarly used for other purposes which require the ability to subsequently machine or deform the inserts 17.

After casting the body half 11 with the inserts 17 embedded therein, one end 31 of each insert 17 is substantially flush with a back side 33 of the body half 11. Each insert includes a butt portion 35 and an axle portion 37. Most of the butt portion 35 is unmachined and retains the shape of the hexagonal machine stock from which the insert 17 is formed. The axle portion 37 of the insert 17 is integral to the butt portion 35 and machined from the same stock from which the butt portion 35 is formed, but the axle portion 37 has been turned, milled or otherwise machined to the appropriate dimensions to have a generally circular cross-section and to serve as an axle, as hereinafter described. A first center bore 39 is drilled or otherwise formed along the axis A from the flush end 31 of each insert 17 to provide for accurate positioning of the butt portion 35 of the insert 17 within a mold 41 prior to and during the introduction of molten metal therein. Opposite the center bore 39 and at the other end of axis A of the insert 17 is a second center bore 43.

A trolley wheel 45 is mounted on the axle portion 37 of each insert 17. For this purpose, the axle portion 37 of each insert 17 is dimensioned such that a distal periphery 47 thereof extends substantially completely through a throughbore 49 of an inner race 51 of the trolley wheel 45 with sufficient protrusion 53 to swage an end 55 of the insert 17 and thereby permanently secure the trolley wheel 45 to the body half 11. The wheel throughbore 49 has an outer countersunk portion 57 so that when the insert end 53 is swaged, a V-shaped structure 59 having an outer diameter which is larger than the throughbore 49 such that the insert axle portion 37 cannot readily be removed therefrom.

Figure 6:
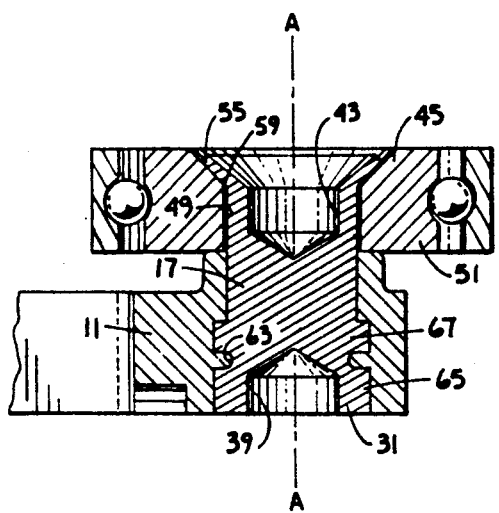
FIG. 6 is a fragmentary view of half of the trolley body similar to that of FIG. 5, but with the axle insert swaged.

An inner circumferential surface 61 of the center bore 43 is chamfered, countersunk, or otherwise machined to remove excess material which might otherwise hinder a subsequent swaging process. The diameter of the center bore 43 relative to the diameter of the axle portion 37 is such that the annular thickness of the material therebetween can be readily swaged to reliably rigidly secure the trolley wheel 45 in place, as illustrated in FIG. 6.

Turned, milled or otherwise formed into the butt portion 35 of each insert 17 is a radial groove 63 which divides the butt portion 35 into a base portion 65 and a rib portion 67. Alternatively, the base portion 65 may be machined similarly to the axle portion 37 so long as sufficient variation exists in the lateral surface of each insert 17 to prevent axial movement thereof relative to the body half 11. The width of the groove 63 is preferably approximately 1/6 inch in width, however, the specific width of the groove 63 can be varied to meet the requirements of any particular application. The depth of the groove 63 must be sufficient to rigidly secure the insert 17 relative to the solidified material thereabout but not so deep that the strength of the insert 17 is weakened due to insufficient material remaining between the groove 63 and the center bore 39.

Figure 7:
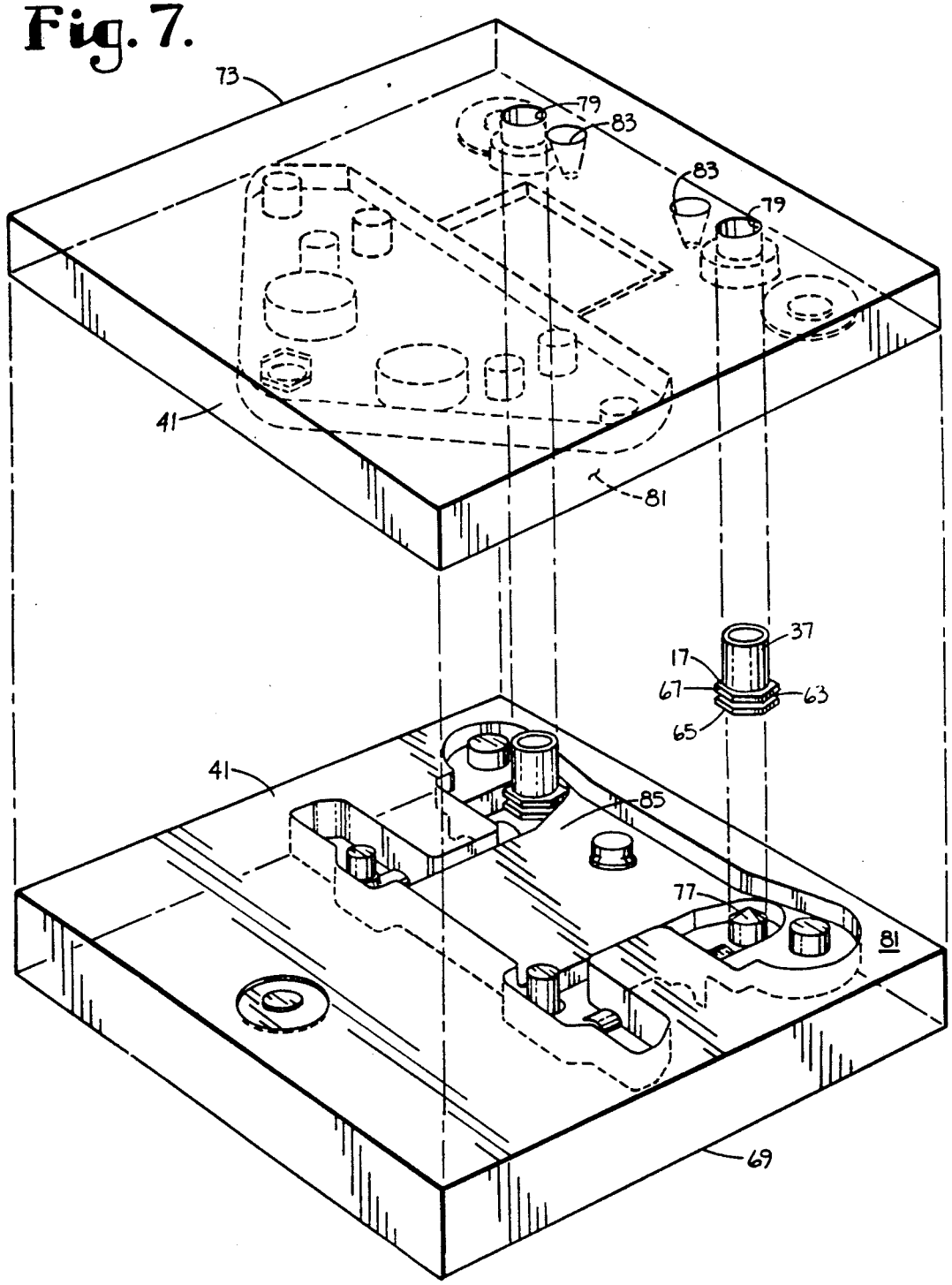
FIG. 7 is an exploded perspective view of a mold for casting half of a trolley body according to the present invention, showing positioning of axle inserts therein.

The actual casting of the trolley body half 11 is performed with casting means or mold means, such as with a shell mold 41 as illustrated in FIG. 7 and as hereinafter described. Usual foundry practice and procedures are followed in carrying out the required operation, both in forming the mold and in producing the casting. The following description is only provided as a brief outline of applicable practice and procedures as they relate to the present invention.

A split pattern (not shown) of the trolley body half 11 is constructed of metal or other appropriate material, with a first portion or mask of such split pattern made in the shape of approximately one-half of the trolley body half 11 and a second portion or mask of said split pattern made in the shape of the remainder of the trolley body half 11. Normally, the composite pattern formed by the joining of such two split patterns will be slightly larger than the desired shape and dimensions of the trolley body half 11 to allow for shrinkage of the molten metal upon cooling. (It is to be understood that where the pattern for the trolley body half 11 is split may vary depending on the particular contours and profiles of a given application; the ensuing discussion is provided only to describe the procedures followed for the present example.)

Each mask of the split pattern is appropriately spaced on adjacently positioned conventional metal plates (not shown) having a splitter bar therebetween. For example, each such plate may be constructed of a rectangularly shaped cast iron plate having a one-inch thickness and dimensions of approximately 15"×20". Each split pattern is appropriately aligned with its respective plate.

With the temperature of the masks at approximately 600° F., a sand hopper (not shown) is then passed over the two masks and fine sand is dropped thereon. Each grain of such sand is coated with a bonding agent in a technique conventionally utilized in the casting industry. Heat transferred from each of the masks to the sand dropped thereon activates the bonding agent causing adjacent grains of sand to adhere to each other, thereby forming a shell over the face of and assuming the form of each of the masks. A shell 69 from the mask for forming the inner side 71 of the body half 11 and a shell 73 from the mask for forming the outer side 75 of the body half 11 are shown in FIG. 7. Locator pins 77 are formed integrally with the shell 69 during the formation thereof. The locater pins 77 are spaced in accordance with locations on the body half 11 where axles or other post-casting operations requiring inserts 17 are desired. Specifically each pin 77 is dimensioned slightly smaller than the diameter of the centerbore 39 of a respective insert 17 to be embedded in the body half 11 such that the pins 77 fit snugly within the centerbore 39. The thickness of the shells 69 and 73 is controlled by the quantity of sand dropped from the hopper and the time duration that heat is transferred from the masks to the sand. A typical thickness of the shells is of the order of one-half inch.

The shells 69 and 73 are formed over an ejecter system (not shown) which pushes up from the bottom, separating the shells 69 and 73 from the masks after an appropriate cure time, which cure time is typically on the order of 60–90 seconds. Appropriately positioned together, the two shells 69 and 73 form a reverse image of the trolley body half 11.

The lower shell or drag portion 69 of the split shell mold 41 is then placed with its reverse image of the inner side 71 of the trolley body half 11 directed upward. The center bore 39 of each of the inserts 17 to be subsequently embedded during the casting process is then telescoped over the corresponding pin 77 with each of the ends 31 firmly pressed against the drag portion 69 of the mold 41 until all the inserts 17 which are to be embedded in the cast body half 11 are positioned within the mold 41. In effect, the inserts 17 are used similarly to that commonly used in the industry for "core prints" which void out portions of a casting, such as that conducted to form the bores 27. If desired, depressions, such as that referenced at 78 in FIG. 2, may be configured into the mold 41 to conserve material, reduce the overall weight of the body half 11, or the like.

The upper shell or cope portion 73 of the split shell mold 41 has bores 79 which are slightly larger than the diameter of the axle portion 37 of the inserts 17. The bores 79 are spaced to coordinate with the inserts 17 where they are placed over the locator pins 77. An appropriate adhesive means, such as phenolic resin paste commonly used in the industry, is then applied to matching surfaces 81 of the shell halves 69 and 73. The cope portion 73 of the mold 41, with its reverse image of the outer side 75 of the trolley body half 11 directed downward, is spaced over the drag portion 69 such that the axle portions 37 of the inserts 17 are slidedly inserted through bores 79 in the cope portion 73. A squeezer press (not shown) is utilized to urge the two shell halves 69 and 73 together while the paste cures. For example, the applied force used to urge the two shell halves 69 and 73 together to assist with setting of the paste is on the order of 120 pounds with a curing time of approximately 30 seconds. Upon removal of the adhered shells 69 and 73 from such squeezer press, the completed shell casting 41 is then ready for the pouring line (not shown) wherein liquid metal is poured into the casting 41.

The production of ADI starts with clean ductile iron that has good nodularity, and with a consistent chemistry and microstructure. Residual elements such as antimony, tin, titanium, chromium, aluminum and sulphur must be minimal. The nodularity should exceed 90% with a nodule count as great as the process allows but not less than 10/sq.mm. In some applications, nodule counts in excess of 200/sq.mm. are routinely obtained without the addition of special downsprue graphitizers. The pearlite/ferrite ratio should be relatively consistent for predictable growth during heat treatment.

The strength of ADI is determined by the heat treatment —not by alloy additions. Alloys such as nickel, copper, manganese and molybdenum are added only to increase hardenability. Alloy additions delay the pearlite reaction thus allowing thicker sections to be hardened without pearlite. In general, however, the less alloy needed the better.

The mold 41 is designed whereby molten material is introduced into the mold 41 through sprues or gates 83 positioned directly above or in the immediate proximity of each of the inserts 17. Typically, the temperature of the molten metal when gated into the mold 41 is approximately 2300°-2375° F. The positioning of the gates 83 near the inserts 17 is preferred in order to obtain appropriate knitting and bonding between each of the inserts 17 and the resulting trolley body half 11 to eliminate a tendency for the cast body half 11 to draw away from the inserts 17 due to shrinkage during cooling. After cooling, a very reliable and sturdy connection exists between the body half 11 and each of the inserts 17.

A pressure head causes the molten metal to course through the mold 41. As the molten metal enters the mold 41, it effectively surrounds the portions of the inserts 17 enclosed within a cavity 85. (If required, pressure may be applied axially to each insert 17 to keep each insert 17 seated around its respective pin 77 during the pouring procedure.) In addition, the molten metal enters into and engulfs the groove 63 of each insert 17. The casting process is continued until the cavity 85 of the mold 41 is completely filled. The resulting cast body half 11 with the inserts 17 embedded therein is then allowed to cool. After completion of the cooling procedure, the final step prior to performing the austempering heat treatment process is to "shake out" the trolley body half 11 with embedded inserts 17 from the shell mold 41.

After removal of the body half 11 with the embedded inserts 17 from the mold 41, any undesired remnants of solidified material remaining from the gates 83 or any risers of the mold 41 are removed by any appropriate means, such as by grinding or the like. An unembedded portion 87 of the axle portion 37 of each of the inserts 17 is exposed externally from the body half 11.

The austempering heat treatment cycle consists of heating the casting in a controlled environment to an austenitizing temperature between 1500° and 1700° F. The casting is then maintained at that temperature for a period of time sufficient to saturate the austenite with carbon. Then the casting is cooled at a rate sufficient to avoid the formation of pearlite and other high temperature transformation products to the appropriate austempering temperature (i.e. 450°-750° F.). The casting is then held at the austempering temperature for a time sufficient to produce the desired properties.

ADI transformed in the 700° F. range exhibits high ductility and impact strength at a tensile strength of about 150,000 psi. ADI transformed at 500° F. exhibits wear resistance comparable to case hardened steel and tensile strength in excess of 220,000 psi. In addition to its remarkable strength properties, ADI is 10% lighter and is more economical to produce than steel.

Various types of quenching systems may be used for ADI. In addition to avoiding pearlite, a fast quench enhances the avoidance of the formation of undesirable high temperature structures.

Figure 5:
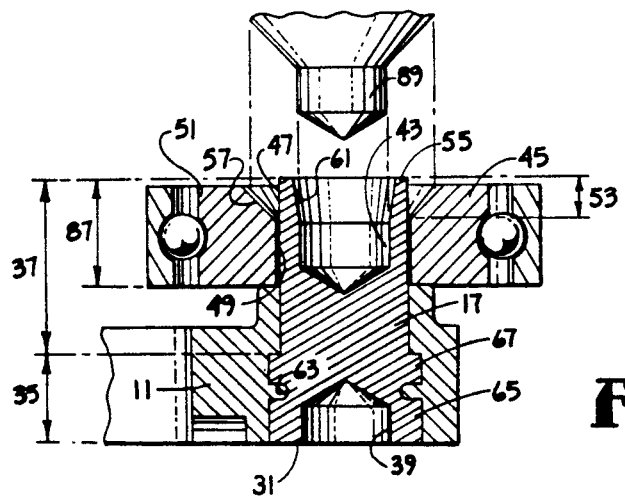
FIG. 5 is a fragmentary, cross-sectional view of half of the trolley body with an unswaged axle insert, taken along line 5—5 of FIG. 4.

Subsequent to completion of the austempering process, the wheels 45 are inserted over the unembedded portions 87 of the inserts 17, and the wheels 45 are rigidly secured to the body half 11, such as by the V-shaped deformation 59 formed by swaging the insert 17 against the countersunk portion 57 of the inner race 51 of the wheels 45 by forcibly inserting a suitably shaped tool 89 therein with a hydraulic press (not shown) as illustrated in FIG. 5.

The hexagonal shape of the insert butt portion 35 resists rotation of each insert 17 in the cast body half 11. In addition to the hexagonal characteristics of the inserts 17, solidified material contained in the groove 63 limits any tendency for movement of the inserts 17 in an axial direction relative to the body half 11. With the added anti-rotational and anti-axial translational capabilities, trolleys 1 formed from such metal castings are less subject to wear, providing less frequent replacement and repair, and less downtime.

It is foreseen that trolley bodies having profiles and contours with substantially greater complexity than that described and illustrated herein can be constructed in accordance with the present invention.

By casting inserts in the trolley body as hereinbefore described, trolley bodies concurrently possessing the desirable characteristics of austempered iron and machinable axles constructed of high strength deformable steel are obtained.

It is to be understood that while certain forms of the present invention have been illustrated and described herein, it is not to be limited to the specific forms or arrangement of parts described and shown.

What is claimed and desired to be secured by Letters Patent is as follows:

1. A trolley for a power and free conveyor system, comprising:

(a) a body formed from casting molten austemperable iron;

(b) a plurality of preformed machinable metal inserts within and extending from said body; said body cast about said inserts during formation of said body; each of said inserts constructed from noncircular machine stock of swagable material; a first end of each of said inserts has a groove in an outer surface thereof being in a plane generally perpendicular to a central axis of the respective insert and wherein the groove is located within the interior of the body; a second end of said insert having a circularly-shaped radial cross-section portion protruding exteriorally of said body; and (c) a wheel having a central bore associated with each of said inserts; each second end of each said insert extending through a respective wheel bore and swaged to secure said wheel thereon.

2. A trolley for a power and free conveyor system, comprising:
(a) preformed machinable metal inserts for axles; and
(b) a body formed from casting austemperable iron about a portion of said axles such that said axles are rigidly secured with said body and extend outwardly therefrom; each of said axles constructed from hexagonally-shaped machine stock and has a transverse groove about a portion thereof embedded in said body.

3. A trolley for a conveyor system having an austemperable cast iron trolley body and at least one axle rotatably supporting a wheel through swaging, the improvement comprising:
(a) at least one insert having a butt portion secured in said body; said insert being formed of swagable material; said insert having a portion projecting form said body and forming said wheel supporting axle; said butt portion being rigidly embedded in said trolley body through cast contact, said butt portion having non-round and grooved peripheral surfaces of sufficient extent to resist rotation and axial translation of said insert.

* * * * *